US009632542B2

(12) United States Patent
Li et al.

(10) Patent No.: US 9,632,542 B2
(45) Date of Patent: Apr. 25, 2017

(54) TOUCH SCREENS COMPRISING GRAPHENE LAYERS

(71) Applicant: The Boeing Company, Chicago, IL (US)

(72) Inventors: Angela W. Li, Everett, WA (US); Jeffrey H. Hunt, Thousand Oaks, CA (US); Wayne R. Howe, Irvine, CA (US)

(73) Assignee: The Boeing Company, Chicago, IL (US)

( * ) Notice: Subject to any disclaimer, the term of this patent is extended or adjusted under 35 U.S.C. 154(b) by 233 days.

(21) Appl. No.: 13/875,806

(22) Filed: May 2, 2013

(65) Prior Publication Data

US 2014/0327838 A1    Nov. 6, 2014

(51) Int. Cl.
| G06F 1/16 | (2006.01) |
| B82Y 30/00 | (2011.01) |
| G06F 3/041 | (2006.01) |
| G06F 3/044 | (2006.01) |

(52) U.S. Cl.
CPC ............ G06F 1/1692 (2013.01); B82Y 30/00 (2013.01); G06F 3/041 (2013.01); G06F 3/044 (2013.01); Y10T 29/49155 (2015.01)

(58) Field of Classification Search
CPC . Y10T 29/49155; G06F 1/1692; G06F 3/044; G06F 3/041; B82Y 30/00
USPC ............................... 349/12; 29/846; 345/173
See application file for complete search history.

(56) References Cited

U.S. PATENT DOCUMENTS

| 8,236,118 | B2 * | 8/2012 | Veerasamy | ............ B82Y 30/00 156/150 |
| 8,563,875 | B2 * | 10/2013 | Dai | ..................... H05K 9/0088 174/390 |
| 2008/0048996 | A1 * | 2/2008 | Hu et al. | ..................... 345/174 |
| 2008/0238882 | A1 * | 10/2008 | Sivarajan | ............... G06F 3/045 345/174 |
| 2009/0051842 | A1 * | 2/2009 | Kim | .................. G02F 1/134363 349/40 |
| 2011/0032196 | A1 * | 2/2011 | Feng | ...................... G06F 3/045 345/173 |
| 2011/0088931 | A1 * | 4/2011 | Lettow | .................. B82Y 30/00 174/257 |
| 2011/0227851 | A1 * | 9/2011 | Oh | ....................... G06F 3/0412 345/173 |

(Continued)

FOREIGN PATENT DOCUMENTS

WO    WO2013/005979 A2    1/2013

OTHER PUBLICATIONS

International Search Report and Written Opinion mailed Jun. 2, 2014 for PCT/US2014/015327, 14 pages.
Bae et al., "Roll-to-roll production of 30-inch graphene films for transparent electrodes," Nature Nanotechnology, vol. 5, No. 8, Aug. 2010, pp. 574-578.

(Continued)

*Primary Examiner* — Andrew Sasinowski
*Assistant Examiner* — Chineyere Wills-Burns
(74) *Attorney, Agent, or Firm* — Smith Moore Leatherwood LLP (57) ABSTRACT

In one aspect, touch screens are described herein. In some implementations, a touch screen comprises an electrically conductive layer and one or more electrodes electrically connected to the electrically conductive layer, wherein the electrically conductive layer comprises a graphene layer. In some implementations, the electrically conductive layer comprises an electrically conductive coating disposed on an electrically insulating substrate.

17 Claims, 6 Drawing Sheets

(56) References Cited

U.S. PATENT DOCUMENTS

| | | | |
|---|---|---|---|
| 2012/0070612 A1* | 3/2012 | Lee .................. | B32B 9/007 |
| | | | 428/141 |
| 2012/0159688 A1* | 6/2012 | Jiang .................. | B82Y 10/00 |
| | | | 2/69 |
| 2012/0319976 A1* | 12/2012 | Ahn et al. .................. | 345/173 |
| 2013/0216811 A1* | 8/2013 | Ghasemi-Nehjad ... | B82Y 30/00 |
| | | | 428/220 |
| 2013/0306461 A1* | 11/2013 | Yue .................. | G06F 3/044 |
| | | | 200/600 |

OTHER PUBLICATIONS

Bonaccorso et al., "Graphene photonics and optoelectronics," Nature Photonics, vol. 4, No. 9, Sep. 2010, pp. 611-622.

Li et al., pending U.S. Appl. No. 13/740,967, filed Jan. 14, 2013.

Shanbhag et al., "Recent Developments to Improve Scratch and Mar Resistance in Automotive Coatings," Jun. 1, 2012, Paint & Coatings Industry, 17 pages retrieved on Apr. 23, 2013 from http://www.pcimag.com/articles/96546-recent-developments-to-improve-scratch-and-mar-resistance-in-automotive-coatings?page=2.

Juehne et al., "Nanomaterials for Advanced Applications," ChemFiles 2005, 8 pages retrieved on Apr. 23, 2013 from http://www.sigmaaldrich.com/technical-documents/articles/chemfiles/nanomaterials-for.html.

Speight, "High Quality, Scalable Graphene Production," U.S. Department of Energy, Oak Ridge National Laboratory, 14 pages retrieved on Apr. 23, 2013 from http://www.ornl.gov/adm/partnerships/events/Dec_Spark/Speight_Graphene%20v5.pdf.

* cited by examiner

TOUCH SCREENS COMPRISING GRAPHENE LAYERS

FIELD

This disclosure relates to touch screens and, in particular, to touch screens comprising one or more graphene layers.

BACKGROUND

The use of touch screens in electronic devices such as cellular phones, tablets, and other so-called smart devices has increased in recent years, especially for consumer electronics applications. Some touch screens operate by detecting small changes in local electronic properties, including capacitance or resistance. However, the fingers of a user can transfer moisture, dirt, dust, oils, or other substances to the surface of a touch screen during use, reducing or destroying the ability of the touch screen to accurately detect user inputs. To address this problem, many touch screens include protective coatings. Unfortunately, many protective coatings can themselves impede the use of the device and/or provide insufficient protection to the touch screen surface. In some cases, for example, a protective coating can be scratched, or be so thick that it is not sufficiently optically transparent, or can reduce the touch screen's sensitivity to changes in local electronic properties, thereby degrading device performance.

Therefore, there exists a need for touch screens and coatings for touch screens that exhibit mechanical toughness, sensitivity to local electronic properties, and optical transparency.

SUMMARY

In one aspect, touch screens are described herein which, in some implementations, may provide one or more advantages over previous touch screens. For example, in some implementations, a touch screen described herein can exhibit improved sensitivity to local electronic properties without sacrificing mechanical toughness, scratch resistance, optical transparency, or resistance to dirt, dust, oils, and moisture. In addition, in some instances, a touch screen described herein is light weight. A touch screen described herein can also be simpler and/or less expensive to manufacture.

In some implementations, a touch screen described herein comprises an electrically conductive layer and one or more electrodes electrically connected to the electrically conductive layer, wherein the electrically conductive layer comprises a graphene layer. The graphene layer, in some implementations, has an average thickness of up to about 200 nm and can comprise one or more graphene sheets, one or more fullerenes, or one or more layers of graphene tubes.

Further, in some implementations, the electrically conductive layer of a touch screen described herein comprises an electrically conductive coating disposed on an electrically insulating substrate. In some cases, the conductive coating is disposed between the graphene layer and the substrate. In other instances, the graphene layer is disposed between the conductive coating and the substrate. In still other implementations, the substrate is positioned between the conductive coating and the graphene layer. Moreover, in some implementations, the graphene layer itself forms the conductive coating of a conductive layer described herein.

Additionally, a touch screen described herein, in some implementations, can further comprise a second electrically conductive layer. In some cases, a touch screen further comprises a second electrically conductive layer and a spacer layer disposed between the first and second electrically conductive layers. The second electrically conductive layer, in some instances, comprises a second graphene layer. Moreover, in some implementations, a touch screen described herein further comprises a protective layer disposed on an electrically conductive layer of the touch screen.

In another aspect, apparatuses comprising a touch screen are described herein which, in some implementations, may provide one or more advantages over prior apparatuses. In some implementations, for example, an apparatus described herein provides a touch screen having improved sensitivity and/or mechanical robustness. In some implementations, the touch screen of an apparatus described herein comprises an electrically conductive layer and one or more electrodes electrically connected to the electrically conductive layer, wherein the electrically conductive layer comprises a graphene layer. Moreover, in some instances, the touch screen of an apparatus described herein comprises a touch screen described hereinabove. Further, an apparatus described herein can be a smart phone, tablet, control panel, cockpit display, seatback display, or other electronic device.

In another aspect, methods of making a touch screen are described herein. In some implementations, a method of making a touch screen comprises disposing a graphene layer on a surface of a substrate to provide an electrically conductive layer comprising graphene on the substrate; and electrically connecting one or more electrodes to the electrically conductive layer comprising graphene. In addition, in some instances, a method described herein further comprises forming a second electrically conductive layer; and separating the first and second electrically conductive layers with a spacer layer disposed between the first and second electrically conductive layers, the conductive layers being arranged in a stacked configuration. Moreover, in some implementations, forming a second electrically conductive layer comprises disposing a second graphene layer on a surface of a second substrate to provide the second electrically conductive layer. Additionally, a method described herein can also comprise disposing a protective layer on one or more electrically conductive layers.

These and other implementations are described in greater detail in the detailed description which follows.

DETAILED DESCRIPTION

Implementations described herein can be understood more readily by reference to the following detailed description, examples, and drawings. Elements, apparatus, and methods described herein, however, are not limited to the specific implementations presented in the detailed description, examples, and drawings. It should be recognized that these implementations are merely illustrative of the principles of the present disclosure. Numerous modifications and adaptations will be readily apparent to those of skill in the art without departing from the spirit and scope of the disclosure.

In addition, all ranges disclosed herein are to be understood to encompass any and all subranges subsumed therein. For example, a stated range of "1.0 to 10.0" should be considered to include any and all subranges beginning with a minimum value of 1.0 or more and ending with a maximum value of 10.0 or less, e.g., 1.0 to 5.3, or 4.7 to 10.0, or 3.6 to 7.9.

Further, when the phrase "up to" is used in connection with an amount or quantity, it is to be understood that the amount is at least a detectable amount or quantity. For example, a material present in an amount "up to" a specified amount can be present from a detectable amount and up to and including the specified amount.

I. Touch Screens

In one aspect, touch screens comprising one or more graphene layers are described herein. A "touch screen," for reference purposes herein, can refer to any of a number of display and/or control screens that can be operated by touching the display area of the screen, including with a finger or a stylus. For example, a touch screen can refer to a resistive touch screen, a surface capacitive touch screen, a projected capacitive touch (PCT) touch screen, a surface acoustic waves (SAW) touch screen, an infrared grid touch screen, an infrared acrylic projection touch screen, an optical imaging touch screen, a dispersive signal technology touch screen, or an acoustic pulse recognition touch screen. A capacitive touch screen can be a mutual capacitance or a self-capacitance touch screen. In addition, a touch screen can be a single-touch or a multi-touch touch screen.

A "graphene" layer, for reference purposes herein, includes $sp^2$-bonded carbon as a primary carbon component, as opposed to $sp^3$-bonded carbon. In some implementations, a graphene layer described herein comprises no $sp^3$-hybridized carbon or substantially no $sp^3$-hybridized carbon. For example, in some implementations, a graphene layer comprises less than about 10 atom percent or less than about 5 atom percent $sp^3$-hybridized carbon, relative to the total amount of carbon in the layer. In some implementations, a graphene layer comprises less than about 2 atom percent or less than about 1 atom percent $sp^3$-hybridized carbon. Moreover, a graphene layer described herein, in some implementations, does not comprise, consist, or consist essentially of diamond-like carbon (DLC). In some implementations, a graphene layer comprises at least about 95 atom percent graphene carbon or consists essentially of graphene carbon.

A graphene layer of a touch screen described herein can provide various properties to the touch screen. For example, in some implementations, a graphene layer of a touch screen described herein functions as a protective coating for the touch screen or for a component of the touch screen. In other implementations, a graphene layer functions as an electrically conductive layer or as a conductive coating. In some cases, electrical conduction can occur in the plane of a graphene layer, such as within the plane of a graphene sheet. Further, in some implementations, a graphene layer described herein can be used in a touch screen architecture as a replacement for a transparent conductive material, such as indium tin oxide (ITO). In some implementations described herein, a graphene layer functions as both a protective coating and a conductive layer or conductive coating. Using a graphene layer as a protective coating and/or an electrically conductive layer or coating, in some implementations, can provide mechanically toughness, resistance to scratching, and/or resistance to damage from external moisture, oils, dirt, or dust to a touch screen. Further, in some implementations, a graphene layer can provide one or more of the foregoing advantages while also exhibiting optical transparency and/or in-plane electrical conductivity. In addition, in some implementations, a thin graphene layer can provide one or more of the foregoing advantages.

In some implementations, a touch screen described herein comprises an electrically conductive layer and one or more electrodes electrically connected to the electrically conductive layer, wherein the electrically conductive layer comprises a graphene layer. The conductive layer comprising graphene can form part of or be incorporated into any touch screen structure or architecture not inconsistent with the objectives of the present disclosure. For example, in some implementations, the conductive layer comprising graphene forms part of a resistive touch screen structure. In other instances, the conductive layer comprising graphene forms part of a capacitive touch screen structure, including a surface capacitive touch screen structure or a PCT touch screen structure. Further, as described herein, a graphene layer can also be used as a protective coating disposed on one or more components of the touch screen instead of or in addition to being used in a conductive layer described herein.

Figure 1:
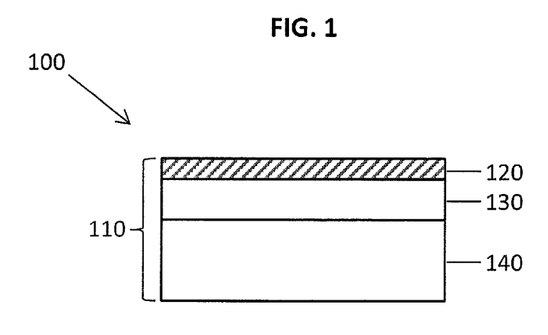
FIG. 1 illustrates a cross sectional view of a touch screen according to one implementation described herein.

Some exemplary implementations of touch screens will now be further described with reference to the figures. FIG. 1 illustrates a cross sectional view of a touch screen according to one implementation described herein. As understood by one of ordinary skill in the art, the various elements depicted in FIG. 1 are representational and are not necessarily drawn to scale. In the implementation of FIG. 1, a touch screen (100) comprises an electrically conductive layer (110) and one or more electrodes (not shown) electrically connected to the conductive layer (110). The conductive layer (110) comprises a graphene layer (120). In addition, the conductive layer (110) comprises an electrically conductive coating (130) disposed on an electrically insulating substrate (140). In the implementation of FIG. 1, the conductive coating (130) is disposed between the graphene layer (120) and the substrate (140). However, other configurations are also possible.

Figure 2:
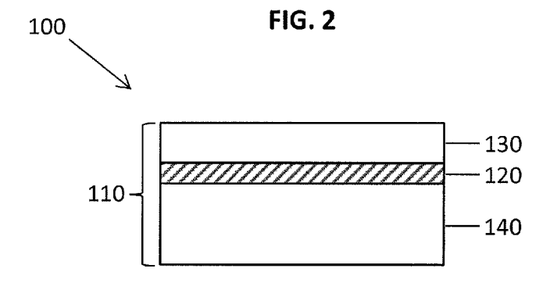
FIG. 2 illustrates a cross sectional view of a touch screen according to one implementation described herein.
Figure 3:
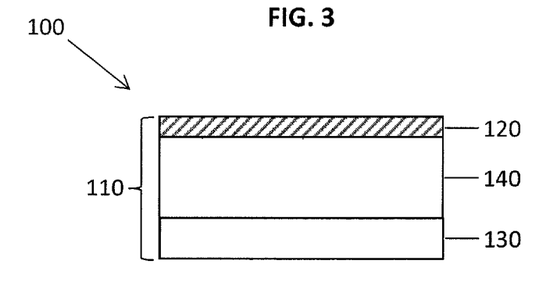
FIG. 3 illustrates a cross sectional view of a touch screen according to one implementation described herein.

For example, FIG. 2 and FIG. 3 illustrate touch screens according to other implementations described herein. In the implementation of FIG. 2, the graphene layer (120) is disposed between a conductive coating (130) and a substrate (140) of a conductive layer (110) of the touch screen (100). In the implementation of FIG. 3, the substrate (140) is positioned between a conductive coating (130) and a graphene layer (120) of a conductive layer (110) of the touch screen (100).

Figure 4:
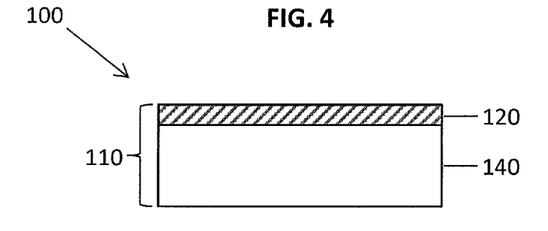
FIG. 4 illustrates a cross sectional view of a touch screen according to one implementation described herein.

Moreover, as illustrated in FIG. 4, it is also possible for a graphene layer (120) to form the conductive coating of a conductive layer (110) of a touch screen (100), such that the conductive coating disposed on the substrate (140) consists or consists essentially of the graphene layer (120). Further, in some implementations, a graphene layer (120) described herein can be imbedded in another layer of the touch screen (100) rather than disposed on another layer of the touch screen (100). For example, in some implementations, a graphene layer is embedded in a substrate to provide a conductive layer.

As depicted in FIGS. 1-4, no additional layers are disposed between the graphene layer (120) and the immediately adjacent layers, such as between the graphene layer (120) and the conductive coating (130) in FIG. 1 and FIG. 2 or between the graphene layer (120) and the substrate (140) in FIG. 4. However, other configurations are also possible. In some implementations, for example, an electrically insulating layer is not disposed between a graphene layer and a conductive coating but one or more non-insulating layers may be disposed between the graphene layer and the conductive coating. In addition, in some implementations, an adhesive or bonding material may be disposed between various layers of a touch screen described herein to adhere or bond the various layers. Further, in some implementations, an adhesive or bonding material can be disposed within a graphene layer described herein. Any adhesive or bonding material not inconsistent with the objectives of the present disclosure may be used. For example, in some implementations, an adhesive or bonding material comprises one or more of a silicone, epoxy, urethane, acrylic, UV cured, tape, film, foil, or solder material.

As understood by one of ordinary skill in the art, an electrically conductive layer described herein, such as an electrically conductive layer illustrated by FIGS. 1-4, can form part of a resistive touch screen structure, capacitive touch screen structure, and/or another touch screen structure. For example, in some implementations, the electrically conductive layer of FIG. 1 could form at least part of a surface capacitive touch screen structure. Similarly, the electrically conductive layer of FIG. 3 could form at least part of a resistive touch screen structure. In addition, the electrically conductive layer of FIG. 4 could form at least part of a capacitive touch screen structure or a resistive touch screen structure. In some implementations, for instance, the graphene layer (120) of FIG. 4 could form an electrically conductive grid that operates as the transparent conductor in a PCT touch screen structure.

In addition, electrically conductive layers described herein, such as the electrically conductive layers (110) described in FIGS. 1-4, can also be used or incorporated into touch screen structures comprising additional features or components that, for the sake of clarity, are not necessarily illustrated in FIGS. 1-4.

In some implementations, for instance, a touch screen structure described herein can further comprise a spacer layer. A spacer layer, in some implementations, can separate an electrically conductive layer described herein from one or more other components of the touch screen. Moreover, the separation or spacing provided by a spacer layer, in some implementations, can provide electrical insulation of the electrically conductive layer from another component of the touch screen. Further, in some implementations, a spacer layer can provide reversible isolation or insulation of an electrically conductive layer. For example, in some implementations, an electrically conductive layer can be reversibly contacted with another component or layer of the touch screen through the spacer layer, such as in response to a temporary deformation of the electrically conductive layer in response to the touch of a user.

Figure 5:
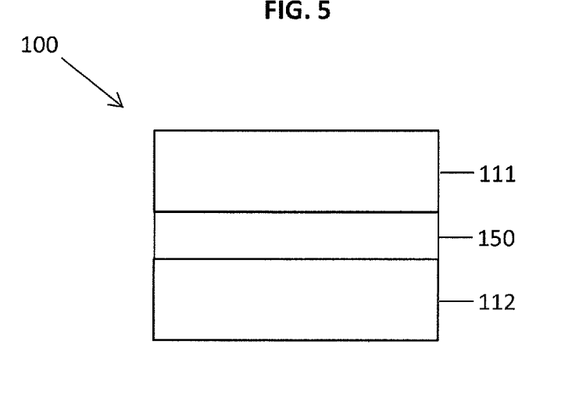
FIG. 5 illustrates a cross sectional view of a touch screen according to one implementation described herein.

One exemplary implementation of a touch screen comprising a spacer layer is illustrated in FIG. 5. However, as understood by those of ordinary skill in the art, a spacer layer can also be used in other touch screen structures in addition to the exemplary implementation of FIG. 5. As illustrated in FIG. 5, a touch screen (100) can comprise a first electrically conductive layer (111), a second electrically conductive layer (112), a spacer layer (150) disposed between the first (111) and second (112) electrically conductive layers, and one or more electrodes (not shown) electrically connected to the first (111) and/or second (112) electrically conductive layers. In the implementation of FIG. 5, the first (111) and/or second (112) electrically conductive layer comprises a graphene layer. Moreover, in some implementations, the first conductive layer (111) comprises a first graphene layer and the second conductive layer (112) comprises a second graphene layer.

Further, the first (111) and/or second (112) conductive layer can have any structure of an electrically conductive layer described herein, including but not limited to a structure of an electrically conductive layer (110) illustrated in FIGS. 1-4. For example, in some implementations, at least one of the first (111) and second (112) electrically conductive layers comprises an electrically conductive coating disposed on an electrically insulating substrate. In some implementations, both the first (111) and second (112) electrically conductive layers comprise an electrically conductive coating disposed on an electrically insulating substrate. In such implementations, the electrically conductive coating and the electrically insulating substrate can have any structure not inconsistent with the objectives of the present disclosure, including a structure described hereinabove in the context of FIGS. 1-4. Moreover, in some implementations, the first conductive coating of the first conductive layer is in facing opposition to the second conductive coating of the second conductive layer, such that the two conductive coatings can be contacted through the spacer layer when the first and/or second conductive layer is deformed, such as in response to a touch applied by a user of the touch screen. Such a touch screen structure could, in some implementations, form a resistive touch screen, as illustrated in FIG. 6.

Figure 6:
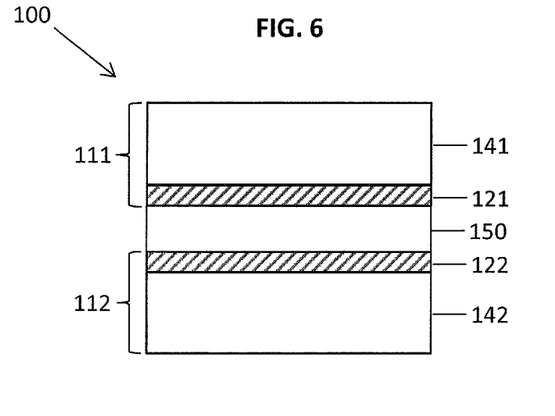
FIG. 6 illustrates a cross sectional view of a touch screen according to one implementation described herein.

FIG. 6 illustrates a cross sectional view of a touch screen according to one implementation described herein, wherein the touch screen comprises a plurality of electrically conductive layers separated by a spacer layer. As illustrated in FIG. 6, the touch screen (100) comprises a first electrically conductive layer (111), a second electrically conductive layer (112), and a spacer layer (150) disposed between the first (111) and second (112) electrically conductive layers. The first conductive layer (111) comprises a first graphene layer (121) disposed on a first substrate (141). The second conductive layer (112) comprises a second graphene layer (122) disposed on a second substrate (142). The first (121) and second (122) graphene layers can function as conductive coatings. Moreover, in the implementation of FIG. 6, first (121) and second (122) graphene layers are in facing opposition to one another and are separated only by the spacer layer (150). Thus, in some implementations, the touch screen (100) of FIG. 6 can comprise a resistive touch screen that operates by contacting the first (121) and second (122) graphene layers through or within the spacer layer (150), such as when the first conductive layer (111) is deformed by pressure applied by a user on the surface of the touch screen (100) closer to the first conductive layer (111) than to the second conductive layer (112).

Figure 7:
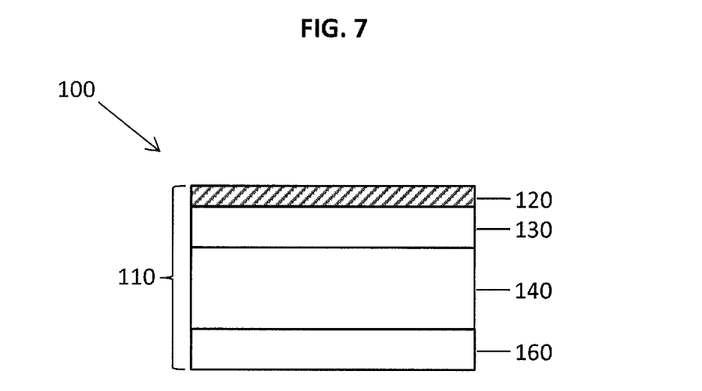
FIG. 7 illustrates a cross sectional view of a touch screen according to one implementation described herein.

As described hereinabove and as understood by one of ordinary skill in the art, it is also possible for a touch screen described herein to comprise a surface capacitive touch screen. One possible structure of a surface capacitive touch screen is illustrated in FIG. 7. As illustrated in FIG. 7, a touch screen (100) comprises an electrically conductive layer (110) comprising an electrically insulating substrate (140) coated with a first electrically conductive coating (130) on a first side of the substrate (140) and with a second electrically conductive coating (160) on a second side of the substrate (140). The conductive layer (110) also comprises a graphene layer (120). As illustrated in FIG. 7, the graphene layer (120) is disposed on the first conductive coating (130). However, other configurations are also possible. For example, in some implementations, the graphene layer (120) can replace the first (130) and/or second (160) electrically conductive coating. In addition, the electrically insulating substrate (140) can comprise any electrically insulating substrate or layer described herein. Further, such a surface capacitive touch screen can further comprise one or more electrodes (not shown) electrically connected to the electrically conductive layer (110). As understood by one of ordinary skill in the art, a surface capacitive touch screen having the structure of FIG. 7, in some implementations, can be operated by applying pressure to the graphene layer (120), such as pressure from a stylus or the finger of a user.

As illustrated in FIG. 7, a graphene layer (120) described herein can, in some implementations, be an exterior layer of a touch screen (100). Thus, as described herein, a graphene layer of an electrically conductive layer can provide mechanical or chemical protection to the touch screen and/or one or more other components of the touch screen. Therefore, in some implementations, the use of an additional protective layer may not be necessary.

However, it is also possible for a touch screen described herein to further comprise one or more additional protective layers. For example, in some implementations, a touch screen described herein can further comprise a protective layer disposed on an electrically conductive layer of the touch screen. Moreover, in some implementations, the protective layer does not comprise a graphene layer described herein. Instead, in some implementations, the protective layer is a flexible non-graphene layer such as a flexible polymer layer or a flexible glass layer. In other implementations, the protective layer is a rigid layer such as a rigid glass layer.

Figure 8:
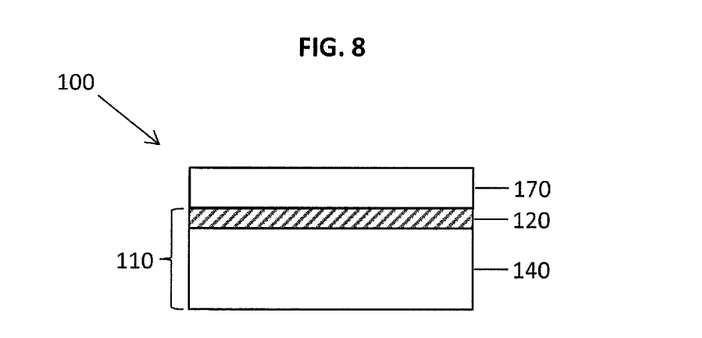
FIG. 8 illustrates a cross sectional view of a touch screen according to one implementation described herein.

As understood by one of ordinary skill in the art, a protective layer described herein can be disposed on an electrically conductive layer in any manner not inconsistent with the objectives of the present disclosure. FIG. 8 illustrates one exemplary implementation of a touch screen comprising a protective layer according to the present disclosure. In the implementation of FIG. 8, a touch screen (100) comprises a protective layer (170) disposed on an electrically conductive layer (110). The electrically conductive layer (110) comprises a graphene layer (120) disposed on a substrate (140). As illustrated in FIG. 8, the protective layer (170), which does not comprise graphene, is disposed immediately adjacent to the graphene layer (120). However, other configurations are also possible.

Turning now to specific components of touch screens, a touch screen described herein comprises an electrically conductive layer comprising a graphene layer. Any graphene layer not inconsistent with the objectives of the present disclosure may be used. In some implementations, a graphene layer comprises, consists, or consists essentially of one or more graphene sheets. A graphene sheet, in some implementations, comprises a single molecular or atomic layer having a flat planar structure. Any number of graphene sheets not inconsistent with the objectives of the present disclosure may be used. In some implementations, a graphene layer comprises a plurality of graphene sheets. The plurality of graphene sheets, in some implementations, can be arranged in a stacked or layered configuration. In other implementations, a graphene layer comprises or consists of a single graphene sheet. Therefore, in some implementations, a graphene layer described herein comprises 1 or more atomic layers of graphene. In some implementations, a graphene layer comprises between 1 and 1000 atomic layers of graphene. In some implementations, a graphene layer comprises between 1 and 500 or between 1 and 100 atomic layers of graphene. In some implementations, a graphene layer comprises between 1 and 5 atomic layers or between 1 and 3 atomic layers of graphene. In some implementations, a graphene layer comprises 1 atomic layer of graphene.

Figure 9:
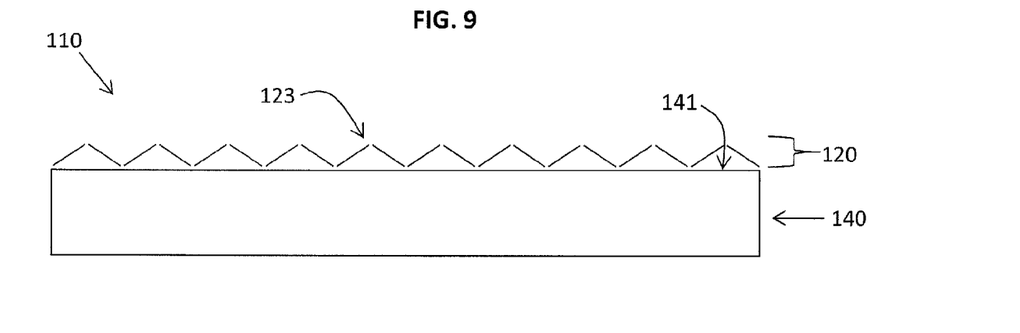
FIG. 9 illustrates a cross sectional view of a graphene layer disposed on a surface of a substrate according to one implementation described herein.

FIG. 9 illustrates a cross sectional view of a graphene layer comprising a graphene sheet disposed on a substrate according to one implementation described herein. As understood by one of ordinary skill in the art, the various elements depicted in FIG. 9 are representational only and are not necessarily drawn to scale. In the implementation of FIG. 9, an electrically conductive layer (110) comprises a substrate (140) and a graphene layer (120) disposed on a surface (141) of the substrate (140). The graphene layer (120) comprises a graphene sheet (123). The graphene sheet (123) is depicted schematically in FIG. 9 by a line resembling an alkane chain. However, as understood by one of ordinary skill in the art, such a depiction is for illustration purposes only. In addition, for purposes of FIG. 9, the identity of the substrate (140) is not particularly limited. For example, if desired, the substrate (140) of the implementation of FIG. 9 could comprise an electrically insulating substrate described hereinabove, such as that illustrated in FIG. 4. Alternatively, the substrate (140) could comprise an electrically conductive coating disposed on an electrically insulating substrate as described hereinabove, such as that illustrated in FIG. 1.

In other implementations, a graphene layer described herein comprises, consists, or consists essentially of a layer of graphene tubes. Any graphene tubes not inconsistent with the objectives of the present disclosure may be used. In some implementations, graphene tubes comprise carbon nanotubes (CNTs) such as single-walled carbon nanotubes (SWNTs) or multi-walled carbon nanotubes (MWNTs). Moreover, graphene tubes can have any size not inconsistent with the objectives of the present disclosure. For example, in some implementations, graphene tubes have a size in at least one dimension of less than about 300 nm or less than about 100 nm. In some implementations, graphene tubes have a size in at least one dimension between about 1 nm and about 200 nm, between about 1 nm and about 150 nm, or between about 5 nm and about 100 nm. In some implementations, graphene tubes have a size in at least one dimension between about 5 nm and about 75 nm or between about 15 nm and about 60 nm. In some implementations, graphene tubes have a size in at least one dimension between about 20 nm and about 30 nm or between about 45 nm and about 55 nm. In some implementations, graphene tubes have a size in at least two dimensions of less than about 300 nm or less than about 100 nm. In some implementations, graphene tubes have a size in at least two dimensions between about 1 nm and about 200 nm, between about 1 nm and about 150 nm, or between about 5 nm and about 100 nm. In some implementations, graphene tubes have a size in at least two dimensions between about 5 nm and about 75 nm or between about 15 nm and about 60 nm.

Moreover, in some implementations, graphene tubes of a graphene layer have a low aspect ratio. In some implementations, graphene tubes have an aspect ratio of about 20 or less or about 10 or less. In some implementations, graphene tubes have an aspect ratio between about 2 and about 15 or between about 3 and about 10. In addition, graphene tubes having an aspect ratio of about 20 or less, in some implementations, have a length ranging from about 5 nm to about 200 nm or from about 10 nm to about 100 nm.

Further, the graphene tubes of a graphene layer described herein, in some implementations, can be oriented in the layer. In some implementations, one or more graphene tubes can be oriented horizontally or substantially horizontally in the layer. In other implementations, one or more graphene tubes can be oriented vertically or substantially vertically in the layer. Moreover, in some implementations, vertically or substantially vertically oriented graphene tubes in a layer are aligned or substantially aligned with one another, including in an array.

Figure 10:
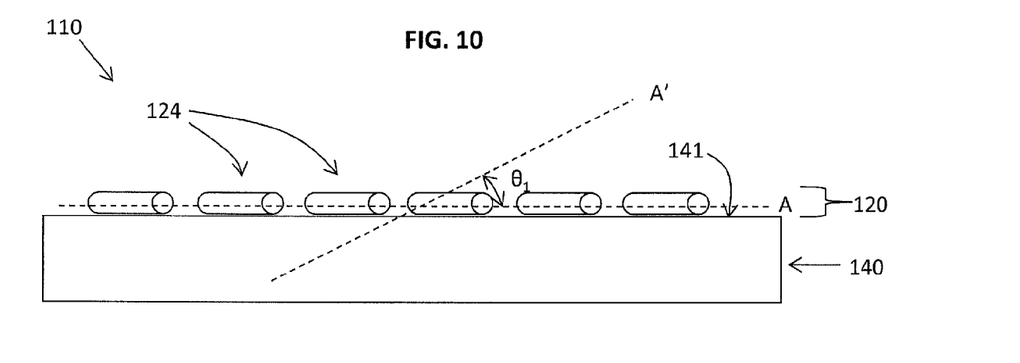
FIG. 10 illustrates a cross sectional view of a graphene layer disposed on a surface of a substrate according to one implementation described herein.
Figure 11:
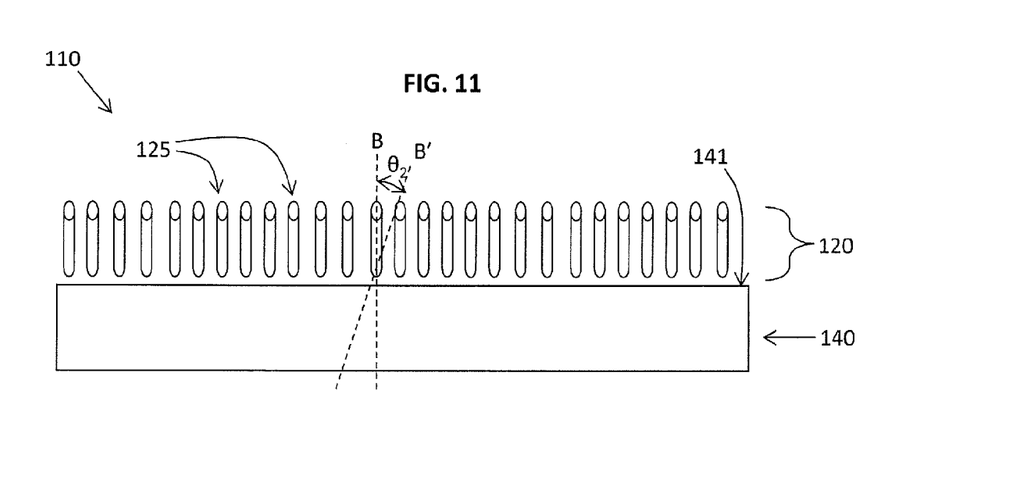
FIG. 11 illustrates a cross sectional view of a graphene layer disposed on a surface of a substrate according to one implementation described herein.

FIGS. 10 and 11 each illustrate a graphene layer comprising a layer of graphene tubes according to some implementations described herein. With reference to FIG. 10, an electrically conductive layer (110) can comprise a substrate (140) and a graphene layer (120) disposed on a surface (141) of the substrate (140). In the implementation of FIG. 10, the graphene layer (120) comprises a plurality of graphene tubes (124) oriented horizontally or substantially horizontally on the surface (141) of the substrate (140). Horizontal orientation is relative to the surface (141). For reference purposes herein, a "horizontal" orientation comprises an orientation wherein the long axis of a graphene tube (124) is oriented parallel to the surface (141). In the implementation of FIG. 10, all of the graphene tubes (124) are depicted as having a long axis oriented parallel to the surface (141). However, other arrangements are possible. For example, in some implementations, one or more graphene tubes can have a long axis along line A' in FIG. 10 or along some other direction that is not parallel to the surface (141). For reference purposes herein, a "substantially horizontal" orientation comprises an orientation wherein the long axis (A') of a graphene tube forms an angle ($\theta_1$) of less than about 45 degrees with a line (A) parallel to the surface (141) of the substrate (140). In some implementations, the angle ($\theta_1$) is less than about 30 degrees or less than about 15 degrees. In some implementations, the angle ($\theta_1$) is between about 0 degrees and about 30 degrees. In some implementations, a majority of the graphene tubes of a graphene layer described herein have a horizontal or substantially horizontal orientation. Further, in some implementations, at least about 60 percent, at least about 70 percent, at least about 80 percent, or at least about 90 percent of the graphene tubes of a graphene layer have a horizontal or substantially horizontal orientation.

In other implementations, the graphene tubes of a graphene layer can be oriented vertically or substantially vertically. For example, with reference to FIG. 11, an electrically conductive layer (110) can comprise a substrate (140) and a graphene layer (120) disposed on a surface (141) of the substrate (140). In the implementation of FIG. 11, the graphene layer (120) comprises a plurality of graphene tubes (125) oriented vertically or substantially vertically on the surface (141) of the substrate (140). Vertical orientation is relative to the surface (141). For reference purposes herein, a "vertical orientation" comprises an orientation wherein the long axis of a graphene tube (125) is oriented perpendicular to the surface (141). In the implementation of FIG. 11, all of the graphene tubes (125) are depicted as having a long axis oriented perpendicular to the surface (141). However, other arrangements are possible. For example, in some implementations, one or more graphene tubes can have a long axis along line B' in FIG. 11 or along some other direction that is not parallel to the surface (141). A "substantially vertical" orientation, for reference purposes herein, comprises an orientation wherein the long axis (B') of a graphene tube forms an angle ($\theta_2$) of less than about 45 degrees with a line (B) perpendicular to the surface of the substrate (140). In some implementations, the angle ($\theta_2$) is less than about 30 degrees or less than about 15 degrees. In some implementations, the angle ($\theta_2$) is between about 0 degrees and about 30 degrees. In some implementations, a majority of the graphene tubes of a graphene layer described herein have a vertical or substantially vertical orientation. Further, in some implementations described herein, at least about 60 percent, at least about 70 percent, at least about 80 percent, or at least about 90 percent of the graphene tubes of a graphene layer have a vertical or substantially vertical orientation.

In addition, in some implementations, a graphene layer described herein comprises, consists, or consists essentially of a monolayer of graphene tubes, including a monolayer of horizontally or substantially horizontally oriented graphene tubes or a monolayer of vertically of substantially vertically oriented graphene tubes.

Further, in some implementations, a graphene layer described herein comprises, consists, or consists essentially of fullerenes and/or heterofullerenes. Heterofullerenes, for reference purposes herein, comprise fullerenes comprising one or more non-carbon atoms, such as boron- or nitrogen-doped fullerenes.

Moreover, a graphene layer described herein can have any thickness not inconsistent with the objectives of the present disclosure. In some implementations, for example, a graphene layer has an average thickness of up to about 300 nm or up to about 200 nm. In some implementations, a graphene layer has an average thickness of about 100 nm or less. In some implementations, a graphene layer has a thickness of about 50 nm or less, about 10 nm or less, or about 5 nm or less. In some implementations, a graphene layer has a thickness of about 3 nm or less, about 2 nm or less, or about 1 nm or less. In some implementations, a graphene layer described herein has an average thickness greater than about 100 nm.

Further, in some implementations wherein a graphene layer described herein comprises a layer of graphene tubes, the average thickness of the graphene layer is no greater than about 50 times the average diameter of the graphene tubes. In some implementations, the average thickness of the graphene layer is no greater than about 20 times or no greater than about 10 times the average diameter of the graphene tubes. In some implementations, the average thickness of the graphene layer is no greater than about 5 times, no greater than about 3 times, or no greater than about 2 times the average diameter of the graphene tubes. In other implementations, the average thickness of the graphene layer is no greater than about 3 times the average length of the graphene tubes. In some implementations, the average thickness of the graphene layer is no greater than about 2 times, no greater than about 1.5 times, or no greater than about 1 times the average length of the graphene tubes.

In addition, a graphene layer of a touch screen described herein, in some implementations, can be disposed on a surface of an electrically insulating substrate or an electrically conductive coating. In some implementations, the graphene layer is disposed directly on the surface of the substrate or conductive coating. Moreover, in some implementations, the graphene layer is bonded or adhered to the surface of the substrate or conductive coating. In some implementations, the graphene layer includes an adhesive or bonding material disposed within the graphene layer. Further, the bonding, in some implementations, comprises chemical bonding. In some implementations, bonding comprises physical bonding. Bonding, in some implementations, comprises or consists of one or more of covalent bonding, ionic bonding, hydrogen bonding, electrostatic interactions, and van der Waals interactions. In some implementations, for instance, bonding comprises or consists of van der Waals interactions. Further, in some implementations, a graphene layer described herein is continuous or substantially continuous across the entire surface of the substrate or conductive coating.

Figure 12:
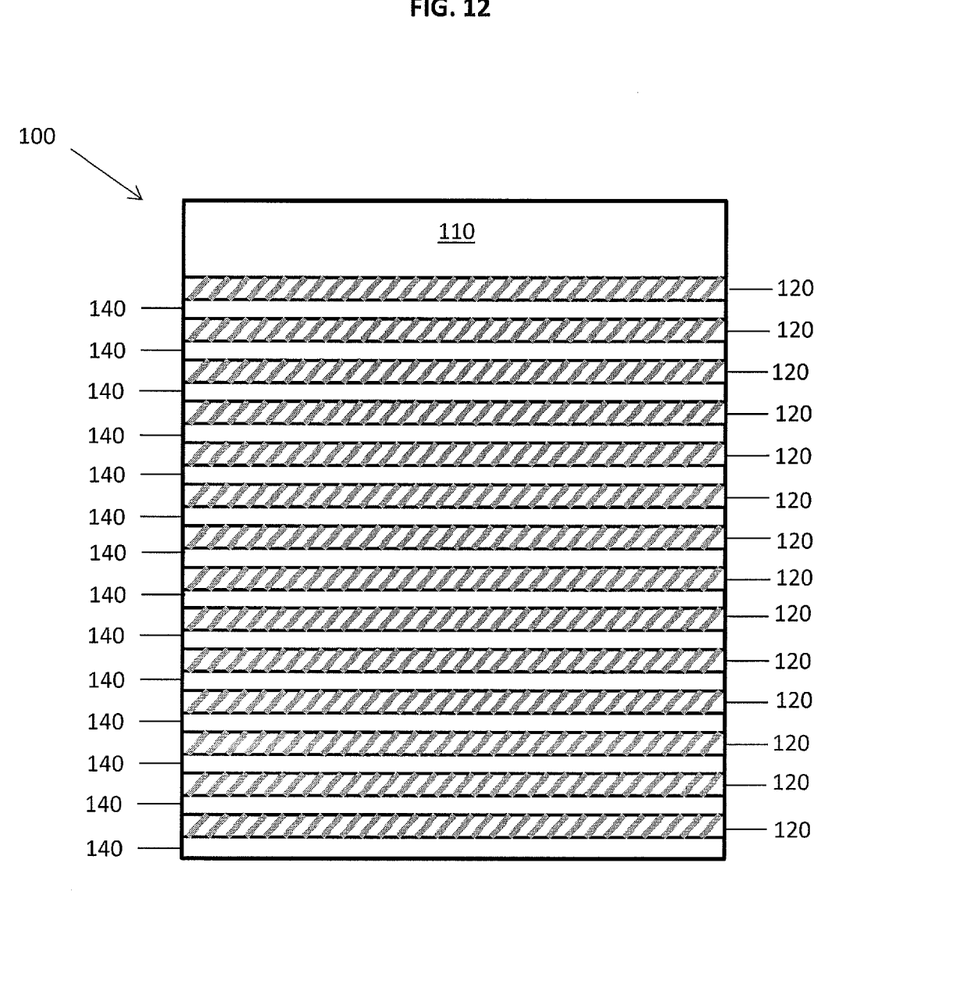
FIG. 12 illustrates a plan view of a touch screen according to one implementation described herein.

However, other configurations of graphene layers on a substrate or coating are also possible. In some implementations, for instance, a graphene layer is a non-continuous or non-contiguous layer. Such a graphene layer, in some implementations, can be suitable for use in a multi-touch touch screen structure. FIG. 12 illustrates a plan view of one implementation of a multi-touch touch screen described herein. As described herein, a multi-touch touch screen can detect multiple simultaneous touches of fingers, styluses, or other contact points that are made on the touch screen.

In the implementation of FIG. 12, the touch screen (100) comprises an electrically conductive layer (110). The electrically conductive layer (110) can have any of the structures of an electrically conductive layer described herein, including a structure described in FIGS. 1-4. However, instead of a continuous and/or contiguous graphene layer, the electrically conductive layer (110) of the implementation of FIG. 12 comprises a plurality of strips or lines of graphene (120). As illustrated in FIG. 12, these strips or lines of graphene (120) are substantially parallel with each other. In addition, the strips or lines of graphene (120) are electrically isolated from each other by strips or lines of electrically insulating material (140). The electrically insulating strips or lines (140) can comprise or be formed by an electrically insulating substrate, adhesive, air, or some other material. Further, the strips or lines of graphene (120) may be connected to one or more electrodes (not shown). Moreover, one or more of the strips or lines of graphene (120) can comprise or be formed from a layer of graphene sheets or nanotubes described herein, including but not limited to a layer of graphene sheets or nanotubes illustrated in any of FIGS. 9-11.

As described herein, an electrically conductive layer (110) having the foregoing structure, in some implementations, can be used to provide a multi-touch touch screen. For example, referring again to FIG. 6, a first "copy" of the electrically conductive layer (110) of FIG. 12 can be used as the first conductive layer (111) in FIG. 6, and a second "copy" of the electrically conductive layer (110) of FIG. 12 can be used as the second conductive layer (112) in FIG. 6. Further, the second copy of the conductive layer (110) that is used as the second conducive layer (112) can be rotated by 90 degrees. In this manner, an X-Y grid of strips or lines of graphene (120) separated by spacer layer (150) can be formed, as shown in FIG. 6. As understood by one of ordinary skill in the art, such a structure or architecture can provide a multi-touch resistive touch screen that is responsive to multiple simultaneous touches, since multiple X-Y coordinates can be simultaneously touched and resistively sensed by the touch screen.

Other configurations of a multi-touch touch screen are also possible. For example, referring again to FIG. 7 and FIG. 12, an X-Y grid can also be formed on opposite sides of an insulating substrate (140). Specifically, the graphene layer (120) and conductive coating (130) of FIG. 7 can comprise or be replaced by the strips or lines of graphene (120) of FIG. 12 to provide half of the X-Y grid on one side of the insulating substrate (140). For example, the strips or lines of graphene (120) can be disposed in a first direction assigned as the X-axis. Then, again with reference to FIG. 7, the second electrically conductive coating (160) can comprise or be with replaced by a second set of strips or lines of graphene (120) according to the implementation of FIG. 12. These second strips or lines of graphene disposed on the opposite side of the substrate (140) can be disposed in a direction perpendicular to the X-axis and assigned as the Y-axis. Thus, as understood by one of ordinary skill in the art, a multi-touch capacitive touch screen can be formed that is responsive to multiple simultaneous touches in this manner as well.

Moreover, as described herein, an electrically conductive layer, in some implementations, comprises an electrically conductive coating that is not necessarily the same as the graphene layer of the electrically conductive layer. Any electrically conductive coating not inconsistent with the objectives of the present disclosure may be used. In some implementations, a conductive coating comprises a transparent conducting film (TCF). In some implementations, a conductive coating comprises or is formed from an inorganic material. For example, in some implementations, a conductive coating comprises, consists or consists essentially of a transparent conducting oxide (TCO) such as indium tin oxide (ITO), fluorine doped tin oxide (FTO), or doped zinc oxide. In some implementations, a conductive coating comprises or is formed from a metal, including a pure metal, metal alloy, or combination of metals. For example, in some implementations, a conductive coating comprises or is formed from gold, silver, copper, or a combination thereof.

In other implementations, a conductive coating comprises or is formed from an organic material. In some implementations, for instance, a conductive coating comprises, consists, or consists essentially of a transparent conducting polymer such as a polyacetylene, polyaniline, polypyrrole, or polythiophene. In some implementations, a conductive coating comprises, consists, or consists essentially of poly (3,4-ethylenedioxythiophene) (PEDOT), poly(4,4-dioctyl-cyclopentadithiophene), poly(styrene sulfonate) (PSS), or a combination thereof, such as PEDOT:PSS.

An electrically conductive coating described herein can have any thickness not inconsistent with the objectives of the present disclosure. In some implementations, a conductive coating has a thickness between about 1 nm and about 1 mm, between about 10 nm and about 1 µm, or between about 100 nm and about 500 nm. In some implementations, a conductive coating has a thickness greater than about 1 mm.

Additionally, in some implementations, an electrically conductive layer comprises an electrically insulating substrate. Any electrically insulating substrate not inconsistent with the objectives of the present disclosure may be used. In some implementations, a substrate comprises or is formed from an inorganic material such as an inorganic oxide or inorganic glass such as soda glass. In some implementations, a substrate is formed from an aluminum oxide, such as sapphire. In some implementations, a substrate is formed from silica or quartz, including fused quartz. In some implementations, a substrate is formed from one or more of BK7 optical glass, synthetic fused quartz and synthetic fused silica, including but not limited to SUPRASIL and INFRASIL. In other implementations, a substrate is formed from an organic material such as an insulating polymer. In some implementations, a substrate comprises or is formed from a polyester, poly(ethylene terephthalate) (PET), polycarbonate, or combination thereof.

An electrically insulating substrate described herein can have any thickness not inconsistent with the objectives of the present disclosure. In some implementations, a substrate has a thickness between about 1 µm and about 1 cm, between about 10 µm and about 100 mm, or between about 100 µm and about 1 mm. In some implementations, a substrate has a thickness of between about 1 mm and about 5 mm. In some implementations, a substrate has a thickness greater than about 1 cm or a thickness less than about 1 µm. For example, in some implementations, a substrate has a thickness between about 200 nm and about 800 nm.

Touch screens described herein, in some implementations, also comprise a spacer layer disposed between two electrically conductive layers. A spacer layer can have any structure and be formed from any material not inconsistent with the objectives of the present disclosure. In some implementations, for example, a spacer layer comprises an air gap or an empty space. In other implementations, a spacer layer is provided by a flexible or deformable support structure such as an array of microdots disposed between the electrically conductive layers. In some implementations, a spacer layer comprises an adhesive. Any adhesive not inconsistent with the objectives of the present disclosure may be used. More generally, in some implementations, a spacer layer can comprise or be formed from an organic or inorganic material, including but not limited to an organic or inorganic material described herein. Other configurations are also possible, as understood by one of ordinary skill in the art.

A spacer layer described herein can have any thickness not inconsistent with the objectives of the present disclosure. In some implementations, a spacer layer has a thickness between about 10 nm and about 1000 µm, between about 100 nm and about 500 µm, or between about 500 nm and about 5 µm. In some implementations, a spacer layer has a thickness greater than about 1 mm or less than about 10 nm.

Moreover, touch screens described herein also comprise one or more electrodes electrically connected to one or more electrically conductive layers of the touch screen. The electrodes can have any structure and be formed from any material not inconsistent with the objectives of the present disclosure. For example, in some implementations, an electrode comprises a metal or metal alloy such as indium, gold, silver, copper, or a combination thereof. In some implementations, an electrode comprises a grid, mesh, or array of metal wires or metal contacts. Non-metal electrodes may also be used. For example, in some implementations, an electrode comprises a transparent conducting oxide or a conducting polymer.

Figure 13:
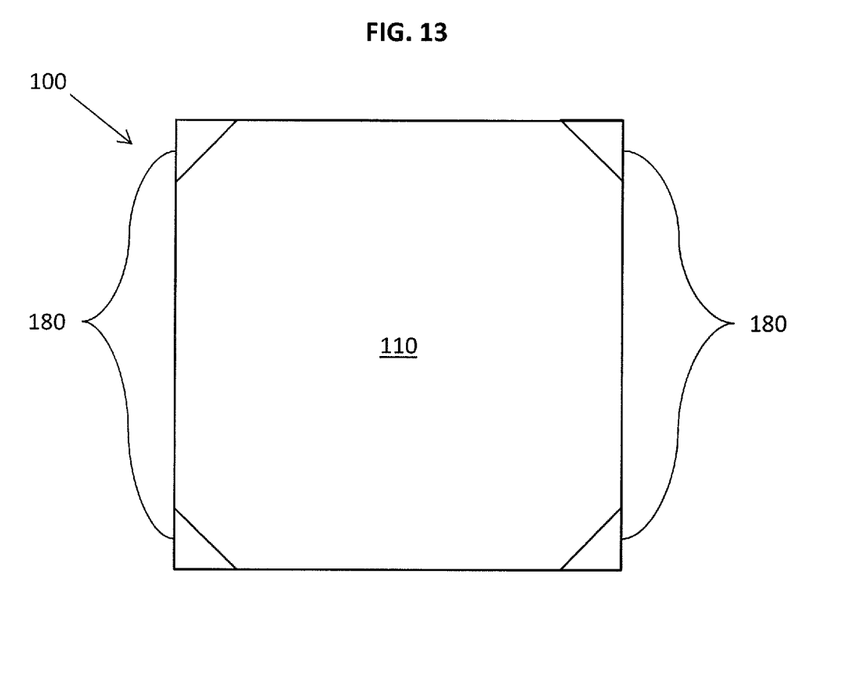
FIG. 13 illustrates a plan view of a touch screen according to one implementation described herein.

Further, the one or more electrodes can be located within a touch screen structure and electrically connected to an electrically conductive layer of the structure in any manner not inconsistent with the objectives of the present disclosure. One exemplary electrode configuration is illustrated in FIG. 13. In the implementation of FIG. 13, a touch screen (100) comprises an electrically conductive layer (110). The electrically conductive layer (110) can have any structure of an electrically conductive layer described herein, including but not limited to a structure described in FIGS. 1-4. As illustrated in FIG. 13, the touch screen (100) has a rectangular shape and four electrodes (180) are disposed in the four corners of the rectangular touch screen (100). A touch screen (100) having such an electrode structure, in some implementations, can operate as a capacitive touch screen such as a surface capacitive touch screen. However, as understood by one of ordinary skill in the art, other electrode configurations are also possible. In some implementations, one or more electrodes of a touch screen described herein are selected based on a desired operational principle of the touch screen. For example, in some implementations, the electrodes are positioned to permit single-touch operation of the touch screen. In other instances, the electrodes are positioned to permit multi-touch operation of the touch screen. In addition, in some implementations, the electrodes are positioned to permit capacitive operation of the touch screen. In other implementations, the electrodes are positioned to permit resistive operation of the touch screen Touch screens described herein, in some implementations, also comprise a protective layer. Any protective layer not inconsistent with the objectives of the present disclosure may be used. In some implementations, a protective layer comprises or is formed from an inorganic material such as an inorganic oxide. In some implementations, a protective layer comprises or is formed from silica or quartz glass. In other implementations, a protective layer comprises or is formed from an organic material such as an organic polymer. A polymeric protective layer, in some implementations, comprises one or more of an acrylate such as poly(methyl methacrylate), a polyurethane, and a polyethylene. A protective layer described herein can also be formed from a composite material. A composite material, in some implementations, comprises a particulate or fiber-shaped inorganic material dispersed in an organic material. For instance, in some implementations, a composite material comprises a fiber glass material disposed in an organic polymer matrix.

A protective layer described herein can have any thickness not inconsistent with the objectives of the present disclosure. In some implementations, a protective layer has a thickness between about 100 nm and about 1 mm, between about 100 nm and about 10 µm, or between about 500 nm and about 5 µm. In some implementations, a protective layer has a thickness greater than about 1 mm.

In some implementations, the material and/or thickness of a protective layer described herein is selected based on a desired operating principle of the touch screen. For example, in some implementations, a flexible polymer or a flexible glass layer is selected for a resistive touch screen structure. In other implementations, a rigid or non-flexible glass layer can be selected for a surface capacitive touch screen structure.

Further, a touch screen described herein, in some implementations, can exhibit one or more desired properties. In some implementations, for instance, an electrically conductive layer of a touch screen described herein exhibits a high optical transparency, including in the visible region of the electromagnetic spectrum. For reference purposes herein, optical transparency is relative to the total amount of incident radiation in a given wavelength range. Optical transparency can be measured with a broad spectral source or a narrow spectral source. Moreover, the optical transparency of a conductive layer can be measured in any manner not inconsistent with the objectives of the present disclosure, including with any suitable instrumentation. For example, in some implementations, optical transparency is measured with a spectrometer such as a BECKMAN spectrometer.

In some implementations, a touch screen or conductive layer of a touchscreen described herein exhibits an optical transparency of at least about 90 percent or at least about 95 percent between about 350 nm and about 750 nm. In some implementations, a touch screen or conductive layer of a touchscreen exhibits a transparency of at least about 98 percent between about 350 nm and about 750 nm. In some implementations, a touch screen or conductive layer of a touchscreen exhibits a transparency of at least about 99.9 percent or at least about 99.99 percent between about 350 nm and about 750 nm. In some implementations, a touch screen or conductive layer of a touchscreen exhibits an optical transparency between about 90 percent and about 99.99 percent or between about 95 percent and about 98 percent at wavelengths between about 350 nm and about 750 nm. Moreover, in some implementations, a touch screen or conductive layer of a touchscreen described herein exhibits an optical transparency of about 85 percent to about 99.99 percent or about 90 percent to about 95 percent at wavelengths between about 200 nm and about 800 nm or between about 220 nm and about 350 nm.

II. Apparatuses Comprising a Touch Screen

In another aspect, apparatuses comprising a touch screen are described herein. An apparatus can comprise any touch screen described in Section I hereinabove. In some implementations, for example, an apparatus comprises a touch screen comprising an electrically conductive layer and one or more electrodes electrically connected to the electrically conductive layer, wherein the electrically conductive layer comprises a graphene layer. Moreover, an apparatus described herein, in some implementations, comprises an electronic device. An electronic device can include but is not limited to one or more of a smart phone, a tablet computer, a tablet device, a display monitor, a television, a cockpit display, a seatback display, and a control panel.

III. Methods of Making a Touch Screen

In yet another aspect, methods of making a touch screen are described herein. In some implementations, a method of making a touch screen comprises disposing a graphene layer on a surface of a substrate to provide an electrically conductive layer comprising graphene on the substrate; and electrically connecting one or more electrodes to the electrically conductive layer. A method described herein can be used to provide any touch screen and/or electrically conductive layer described herein.

In addition, in some implementations, a method described herein further comprises providing or forming a second electrically conductive layer; and separating the first and second electrically conductive layers with a spacer layer disposed between the first and second electrically conductive layers, the conductive layers being arranged in a stacked configuration. Moreover, in some implementations, a method described herein further comprises disposing a protective layer on an electrically conductive layer of the touch screen.

Turning now to specific steps of methods, methods of making a touch screen described herein comprise providing a substrate or disposing a graphene layer on a surface of a substrate. Any substrate not inconsistent with the objectives of the present disclosure may be used. In some implementations, a substrate comprises a substrate described hereinabove in Section I. For example, in some implementations, the substrate comprises an insulating substrate or an insulating substrate coated with an electrically conductive coating such as ITO. In some implementations, the substrate comprises a spacer layer described herein.

Methods of making a touch screen described herein also comprise disposing a graphene layer on a surface of a substrate to provide an electrically conductive layer comprising graphene. A graphene layer can be disposed on a surface of a substrate in any manner not inconsistent with the objectives of the present disclosure. In some implementations, for instance, disposing a graphene layer on a surface of a substrate comprises disposing the graphene layer in between a conductive coating and the substrate or on a surface of the substrate opposite a conductive coating disposed on the substrate. Further, any graphene layer described hereinabove in Section I may be disposed on a substrate. For example, in some implementations, a graphene layer comprises one or more graphene sheets.

Further, in some implementations, disposing a graphene layer is carried out using vapor deposition. Vapor deposition, in some implementations, comprises chemical vapor deposition (CVD). For example, in some implementations, CVD can be used to provide a graphene layer comprising one or more graphene sheets. Any CVD method not inconsistent with the objectives of the present disclosure may be used. For example, in some implementations, one or more of atmospheric pressure CVD, ultrahigh vacuum CVD, or hot filament (or hot wire or catalytic) CVD can be used. In some implementations, a CVD method comprises disposing a graphene layer from one or more carbon-containing gas-phase reactants. In some implementations, a gas-phase reactant comprises a hydrocarbon. In some implementations, a gas-phase reactant comprises benzene, ethane, methane, or a combination or mixture thereof. Further, in some implementations, a gas-phase reactant is provided in a carrier gas such as $H_2$.

In other implementations, disposing a graphene layer is carried out using catalytic vapor phase deposition. For instance, in some implementations, catalytic vapor phase deposition can be used to provide a graphene layer comprising a layer of graphene tubes having a vertical or substantially vertical orientation described herein. Any catalytic vapor phase deposition method not inconsistent with the objectives of the present disclosure may be used. In some implementations, a catalytic vapor phase deposition method comprises disposing metal catalyst particles on a surface of a substrate. The metal catalyst particles, in some implementations, can be disposed on the substrate in an array, such as an ordered array of equally spaced particles. Further, the metal catalyst particles can have any size and chemical composition not inconsistent with the objectives of the present disclosure. Moreover, the size of the metal catalyst particles, in some implementations, is selected to obtain a desired graphene tube diameter. In some implementations, for example, the metal catalyst particles have an average diameter ranging from about 1 nm to about 20 nm or about 1 nm to about 10 nm. In some implementations, the metal catalyst particles have an average diameter of less than about 1 nm. Further, in some implementations, the metal catalyst particles comprise one or more transition metals, including pure metals, metal alloys, or mixtures of metals. In some implementations, the metal catalyst particles comprise nickel particles. In other implementations, the metal catalyst particles comprise a noble metal such as gold or silver.

In addition, in some implementations, a catalytic vapor phase deposition method described herein further comprises disposing the substrate in a vacuum chamber and heating the substrate. A substrate comprising a layer of metal catalyst particles can be heated in the vacuum chamber to any temperature not inconsistent with the objectives of the present disclosure. In some implementations, the substrate is heated to a temperature between about 600° C. and about 800° C. In some implementations, the substrate is heated to a temperature of about 700° C.

In some implementations, a catalytic vapor phase deposition method further comprises introducing one or more gases into the vacuum chamber, wherein at least one gas comprises a carbon-containing species. In some implementations, a carbon-containing gas such as acetylene or ethylene is introduced with a process gas such as ammonia or nitrogen. In this manner, in some implementations, a layer of graphene tubes can be grown on the metal catalyst particles disposed on the substrate.

In other implementations, disposing a graphene layer is carried out using laser ablation. Any laser ablation method not inconsistent with the objectives of the present disclosure may be used. In some implementations, a laser ablation method comprises disposing a graphite target and a substrate in a high-temperature reaction chamber and exposing the graphite target to a pulsed laser beam to vaporize at least a portion of the target. In some implementations, a laser ablation method further comprises providing one or more inert gases in the reaction chamber. Providing one or more inert gases, in some implementations, comprises flowing the inert gases through the reaction chamber. Moreover, in some implementations described herein, a surface of the substrate within the reaction chamber is cooler than the ablation temperature, so that vaporized carbon condenses on the surface of the substrate. In some implementations, the condensed carbon forms graphene tubes on the surface of the substrate. Further, in some implementations, a method described herein further comprises applying an electrical field or voltage to the substrate during condensation to provide a preferred growth direction of the graphene tubes. In this manner, in some implementations, an electrically conductive layer described herein can be provided, wherein the conductive layer comprises a graphene layer comprising graphene tubes disposed on a substrate, including graphene tubes having a preferred orientation. In some implementations, the graphene tubes are horizontally or substantially horizontally oriented.

A graphene layer provided by a method described herein can have any property of a graphene layer described hereinabove in Section I. For instance, in some implementations, a graphene layer produced by a method described herein has a thickness of about 100 nm or less. Moreover, the thickness of a graphene layer described herein, in some implementations, can be selected by varying one or more parameters during deposition of the graphene layer on a substrate. For example, in some implementations, the thickness of the graphene layer is selected by varying the deposition time, where a shorter deposition time provides a thinner graphene layer. Further, a deposition time, in some implementations, can be selected using information obtained from a microbalance (such as a quartz crystal microbalance) arranged to determine the mass of material deposited on a substrate. In some implementations, the information is obtained in real-time by providing information regarding the output of the microbalance (e.g., a measured mass change of a substrate) to the deposition apparatus such as a chemical vapor deposition system, thereby forming a feedback loop.

Moreover, to obtain a touch screen comprising one or more strips or lines of graphene such as those illustrated in FIG. 12, a method described herein can comprise first disposing a graphene layer using a method described hereinabove and then removing a portion of the layer in a desired pattern. For instance, in some implementations, laser ablation can be used to remove or ablate thin strips or lines of graphene, leaving behind strips or lines of exposed substrate between strips or lines of graphene layers, such that each strip or line of graphene is electrically isolated from the other strips or lines of graphene. Alternatively, an etching and masking technique may be used if desired. For example, as understood by one of ordinary skill in the art, an etching and masking technique can be used wherein a desired portion or pattern of the graphene layer (such as a masked portion or an exposed portion) does not adhere to the substrate or can be easily removed from the substrate, thus providing strips or lines of graphene such as those illustrated in the implementation of FIG. 12.

Methods of making a touch screen described herein also comprise electrically connecting one or more electrodes to the electrically conductive layer. Any electrodes not inconsistent with the objectives of the present disclosure can be used. In addition, the electrodes can be electrically connected to an electrically conductive layer in any manner not inconsistent with the objectives of the present disclosure, including but not limited to a manner described hereinabove in Section I. For example, in some implementations, four corner electrodes are provided and electrically connected as illustrated in FIG. 13. In other implementations, a network, mesh, or grid of electrodes is provided and electrically connected to one or more electrically conductive layers described herein to provide a touch screen having a PCT touch screen structure, as illustrated in FIG. 12. As understood by those of ordinary skill in the art, other electrode configurations may also be used. In some implementations, one or more electrodes are electrically connected based on a desired principle of operation of the resulting touch screen structure.

In addition, in some implementations, a method described herein further comprises providing or forming a second electrically conductive layer. The second electrically conductive layer can comprise any electrically conductive layer not inconsistent with the objectives of the present disclosure, including but limited to a second electrically conductive layer described hereinabove in Section I. For example, in some implementations, the second electrically conductive layer comprises a second graphene layer and has a structure illustrated in any of FIGS. 1-4. Moreover, in some implementations, providing or forming a second electrically conductive layer comprises disposing a second graphene layer on a surface of a second substrate to provide the second electrically conductive layer.

Methods described herein, in some implementations, also comprise separating first and second electrically conductive layers with a spacer layer disposed between the first and second electrically conductive layers. Any spacer layer not inconsistent with the objectives of the present disclosure may be used, including but not limited to a spacer layer described hereinabove in Section I. In some implementations, for instance, an array of flexible or compressible microdots is used to separate a first conductive layer from a second conductive layer such that deformation of the first conductive layer by a user can provide contact between the first and second conductive layers, thereby providing sensitivity of the touch screen to user input.

Moreover, in some implementations, a method described herein further comprises disposing a protective layer on an electrically conductive layer of a touch screen. A protective layer can be disposed on an electrically conductive layer in any manner and can be formed from any material not inconsistent with the objectives of the present disclosure. For example, in some implementations, a protective layer provided in a method described herein comprises a protective layer described hereinabove in Section I, including but not limited to a protective layer illustrated in FIG. 8. In some implementations, a protective layer is disposed on an electrically conductive layer after formation of a graphene layer described herein. In some implementations, a protective layer is disposed on a conductive layer using one or more of heat, vacuum, and pressure.

Various implementations of the disclosure have been described in fulfillment of the various objectives of the disclosure. It should be recognized that these implementations are merely illustrative of the principles of the present disclosure. Numerous modifications and adaptations thereof will be readily apparent to those skilled in the art without departing from the spirit and scope of the disclosure.

That which is claimed is:

1. A touch screen comprising:
   an electrically conductive layer; and
   one or more electrodes electrically connected to the electrically conductive layer,
   wherein the electrically conductive layer comprises a graphene layer,
   wherein the graphene layer is an exterior surface of the touch screen, and
   wherein the graphene layer comprises at least 95 atom percent graphene carbon.

2. The touch screen of claim 1, wherein the electrically conductive layer comprises an electrically conductive coating disposed on an electrically insulating substrate.

3. The touch screen of claim 2, wherein the graphene layer forms the electrically conductive coating.

4. The touch screen of claim 1, wherein the electrically conductive layer comprises a conductive coating disposed between the graphene layer and a substrate.

5. The touch screen of claim 1, wherein the electrically conductive layer comprises a substrate positioned between a conductive coating and the graphene layer.

6. The touch screen of claim 1 further comprising:
   a second electrically conductive layer; and
   a spacer layer disposed between the first and second electrically conductive layers.

7. The touch screen of claim 6, wherein at least one electrically conductive layer comprises an electrically conductive coating disposed on an electrically insulating substrate.

8. The touch screen of claim 6, wherein the second electrically conductive layer comprises a second graphene layer.

9. The touch screen of claim 1, wherein the graphene layer has an average thickness of up to 100 nm.

10. The touch screen of claim 9, wherein the graphene layer comprises one or more graphene sheets having a total of 1 to 10 atomic layers.

11. The touch screen of claim 1, wherein the graphene layer comprises a layer of graphene tubes.

12. The touch screen of claim 11, wherein the graphene tubes have a horizontal or substantially horizontal orientation.

13. The touch screen of 11, wherein the graphene tubes have a vertical or substantially vertical orientation.

14. An apparatus comprising a touch screen, the touch screen comprising:
   an electrically conductive layer; and
   one or more electrodes electrically connected to the electrically conductive layer,
   wherein the electrically conductive layer comprises a graphene layer,
   wherein the graphene layer is an exterior surface of the touch screen, and
   wherein the graphene layer comprises at least 95 atom percent graphene carbon.

15. A method of making a touch screen comprising:
   providing a substrate;
   disposing a graphene layer on a surface of the substrate to provide an electrically conductive layer comprising graphene;
   providing one or more electrodes; and
   electrically connecting the one or more electrodes to the electrically conductive layer,
   wherein the graphene layer is an exterior surface of the touch screen, and
   wherein the graphene layer comprises at least 95 atom percent graphene carbon.

16. The method of claim 15 further comprising:
   providing a second electrically conductive layer;
   providing a spacer layer; and
   separating the first and second electrically conductive layers with the spacer layer, the conductive layers being arranged in a stacked configuration.

17. The method of claim 16, wherein providing the second electrically conductive layer comprises providing a second substrate and disposing a second graphene layer on a surface of the second substrate to provide the second electrically conductive layer.

* * * * *